United States Patent
Bosshard et al.

(10) Patent No.: US 9,843,199 B2
(45) Date of Patent: Dec. 12, 2017

(54) INDUCTIVE POWER TRANSFER SYSTEM AND METHOD FOR OPERATING AN INDUCTIVE POWER TRANSFER SYSTEM

(71) Applicant: ABB TECHNOLOGY AG, Zurich (CH)

(72) Inventors: Roman Bosshard, Aarau (CH); Johann Walter Kolar, Zurich (CH); Francisco Canales, Baden-Dattwil (CH); Beat Guggisberg, Untersiggenthal (CH); Guanghai Gong, Birmenstorf (CH); Bernhard Wunsch, Baden-Dattwil (CH)

(73) Assignee: ABB Schweiz AG, Baden (CH)

( * ) Notice: Subject to any disclaimer, the term of this patent is extended or adjusted under 35 U.S.C. 154(b) by 318 days.

(21) Appl. No.: 14/672,803

(22) Filed: Mar. 30, 2015

(65) Prior Publication Data

US 2015/0280455 A1   Oct. 1, 2015

(30) Foreign Application Priority Data

Mar. 31, 2014  (EP) .................................... 14162789

(51) Int. Cl.
*B60L 5/00* (2006.01)
*B60L 11/18* (2006.01)
*H02J 5/00* (2016.01)
*H02J 7/02* (2016.01)
(Continued)

(52) U.S. Cl.
CPC .............. *H02J 5/005* (2013.01); *B60L 5/005* (2013.01); *B60L 11/182* (2013.01);
(Continued)

(58) Field of Classification Search
CPC .. B60L 5/005; B60L 11/1811; B60L 11/1812; B60L 11/182; H01F 38/14;
(Continued)

(56) References Cited

U.S. PATENT DOCUMENTS

| | | | |
|---|---|---|---|
| 8,654,483 B2* | 2/2014 | Etter | H02M 1/32 361/18 |
| 2008/0130322 A1* | 6/2008 | Artusi | H02M 1/4225 363/21.01 |

(Continued)

FOREIGN PATENT DOCUMENTS

| CH | 698 918 B1 | 12/2009 |
|---|---|---|
| WO | 2012/005607 A2 | 1/2012 |

OTHER PUBLICATIONS

Goeldi, et al., "Design and Dimensioning of a Highly Efficient 22 kW Bidirectional Inductive Charger for E-Mobility," PCIM Europe 2013, May 14-16, 2013, pp. 1496-1503, VDE Verlag GMBH, Berlin.

(Continued)

*Primary Examiner* — Levi Gannon
(74) *Attorney, Agent, or Firm* — Taft Stettinius & Hollister LLP

(57) ABSTRACT

An exemplary inductive power transfer system having a transmitter coil and a receiver coil. A transmitter-side power converter having a mains rectifier stage powering a transmitter-side dc-bus and controlling a transmitter-side dc-bus voltage $U_{1,dc}$. A transmitter-side inverter stage with a switching frequency $f_{sw}$ supplies the transmitter coil with an alternating current. A receiver-side power converter having a receiver-side rectifier stage that rectifies a voltage induced in the receiver coil and powering a receiver-side dc-bus and a receiver-side charging converter controlling a receiver-side dc-bus voltage $U_{2,dc}$. Power controllers that determine from a power transfer efficiency of the power transfer, reference values $U_{1,dc}^*$, $U_{2,dc}^*$ for the transmitter and receiver side dc-bus voltages. An inverter stage switching controller controls the switching frequency $f_{sw}$ to reduce losses in the transmitter-side inverter stage.

16 Claims, 7 Drawing Sheets

(51) Int. Cl.
    *H02J 50/12*     (2016.01)
    *H02J 50/80*     (2016.01)
    *H02M 1/00*     (2006.01)
    *H02M 3/337*     (2006.01)

(52) U.S. Cl.
    CPC ........... *B60L 11/1812* (2013.01); *H02J 7/025* (2013.01); *H02J 50/12* (2016.02); *H02J 50/80* (2016.02); *B60L 2210/10* (2013.01); *B60L 2210/30* (2013.01); *B60L 2210/40* (2013.01); *H02M 3/3376* (2013.01); *H02M 2001/007* (2013.01); *H02M 2001/0054* (2013.01); *H02M 2001/0058* (2013.01); *Y02T 10/7005* (2013.01); *Y02T 10/7072* (2013.01); *Y02T 10/7216* (2013.01); *Y02T 10/7241* (2013.01); *Y02T 90/122* (2013.01); *Y02T 90/127* (2013.01); *Y02T 90/14* (2013.01)

(58) Field of Classification Search
    CPC .. H02J 5/005; H02J 7/025; H02J 17/00; H02J 50/10; H02J 50/12; H02J 50/80; H02M 2001/0054; H02M 2001/0058; H02M 2001/007; H04B 5/0031; H04B 5/0037; H04B 5/0075; Y02T 10/7005; Y02T 10/7072; Y02T 90/122; Y02T 90/127
    USPC ........................................................ 307/104
    See application file for complete search history.

(56) References Cited

U.S. PATENT DOCUMENTS

| | | | | |
|---|---|---|---|---|
| 2008/0198632 | A1* | 8/2008 | Takayanagi | H02M 7/797 363/17 |
| 2010/0097827 | A1* | 4/2010 | Ben-Yaakov | H05B 41/2886 363/65 |
| 2012/0092896 | A1* | 4/2012 | Hachiya | B60L 11/1812 363/16 |
| 2013/0057200 | A1* | 3/2013 | Potts | H02M 3/33584 320/107 |
| 2013/0058134 | A1* | 3/2013 | Yamada | H02M 7/217 363/17 |
| 2013/0088088 | A1 | 4/2013 | Wambsganss et al. | |
| 2013/0088177 | A1* | 4/2013 | Niizuma | H02P 27/085 318/139 |
| 2014/0015330 | A1 | 1/2014 | Byun et al. | |
| 2014/0268897 | A1* | 9/2014 | Zimmanck | H02M 3/3353 363/17 |
| 2014/0354074 | A1* | 12/2014 | Sadakata | H02M 1/4225 307/104 |
| 2015/0214847 | A1* | 7/2015 | Shimada | H02J 7/0052 320/107 |
| 2015/0280593 | A1* | 10/2015 | Ando | H02M 1/42 363/17 |
| 2016/0126863 | A1* | 5/2016 | Ayai | H02M 1/14 363/132 |

OTHER PUBLICATIONS

Nussbaumer, et al., "Comprehensive Design of a Three-Phase Three-Switch Buck-Type PWM Rectifier," IEEE Transactions on Power Electronics, Mar. 2007, pp. 551-562, vol. 22, No. 2. IEEE.

Ortiz, et al., "Modeling of Soft-Switching Losses of IGBTs in High-Power High-Efficiency Dual-Active-Bridge DC/DC Converters," IEEE Transactions on Electron Devices, Feb. 2013, pp. 587-597, vol. 60, No. 2. IEEE.

* cited by examiner

INDUCTIVE POWER TRANSFER SYSTEM AND METHOD FOR OPERATING AN INDUCTIVE POWER TRANSFER SYSTEM

RELATED APPLICATION(S)

This application claims priority under 35 U.S.C. §119 to European application No. 14162789.3 filed in Europe on Mar. 31, 2014, the entire content of which is hereby incorporated by reference.

FIELD

The disclosure relates to an inductive power transfer system, in particular a battery charging system for the wireless transmission of charging energy to an electric vehicle and a method for operating such a power transfer or charging system.

BACKGROUND INFORMATION

Inductive charging systems designed for electric vehicles (EV) employ a transmitter coil, which is placed on or embedded in the road surface, to inductively transmit the charging energy via the air gap between the road surface and the vehicle to a receiver coil mounted to the underfloor of the EV. Similar to a traditional transformer, an alternating current in the windings of the transmitter coil is used to produce the magnetic flux specified to transfer the charging energy. Due to the large air gap inherent to the technology, the leakage flux of this transformer is high. It is known that the power efficiency of the transmission can be high despite the high leakage flux if one or more resonant compensation capacitors are connected to the terminals of the receiver coil. The structure of a known inductive charging system is shown in FIG. 1(a), with transmitter coils 3, 5 and compensation capacitors 6. The meaning of the remaining reference numerals is explained in the context of the other figures. The capacitors 6 form a resonant circuit with the receiver coil 4 inductance. If the transmitter coil 3 carries an alternating current with a fundamental frequency, which corresponds to the resonant frequency of the resonant circuit on the receiver side, the power is transferred with high efficiency.

A rectifier 13 and passive filter components 16 can be connected to the terminals of the receiver circuit to produce a steady dc-voltage from which the battery 2 is charged. To control the current in the transmitter coil 3, a full-bridge inverter 9 supplied from a constant dc-bus 10 voltage can be used. Other topologies, such as the three-level neutral point clamped converter could also be possible, but are rarely used because the voltages of interest for EV battery charging are more often lower than what could be used to take full advantage of the lower constraints regarding the blocking voltage of three-level topologies. In order to reduce the reactive power specified from the inverter, another resonant capacitor 5 can be connected to the terminals of the transmitter coil 3. The capacitance value of this second capacitor can be chosen such that the specified reactive power is minimized at the receiver-side resonant frequency, for example such that the input impedance of the circuit including the two transmitter coils 3, 4, the resonant capacitors 5, 6, and the load 2 appears ohmic at the resonant frequency of the receiver circuit.

According to an exemplary embodiment of the present disclosure, additional filter elements are connected between the transmitter-side or receiver-side power converters to reduce the stray fields caused by the currents in the transmitter coils. The full-bridge inverter 9 of the transmitter 8 is usually switched close to the resonant frequency with a phase-shift of the bridge legs close to 180°. Experiments can be performed to determine the resonant frequency of the actual charging system before operation or, alternatively, the resonant frequency is estimated from real-time measurements during operation. This determination is advantageous because the resonant frequency can deviate from its anticipated value due to tolerances of the components, temperature drifts, or due to a misalignment of the receiver coil with respect to the transmitter coil. The switching frequency of the full-bridge inverter 9 can then be adjusted to the actual operating conditions using the measured or estimated resonant frequency.

For the battery charging, it is specified that the battery current can be controlled. The battery can be charged according to a current and voltage profile that is specified based on the limitation of the charging current and the voltage stress of the battery, and adapted to the state-of-charge of the battery. A common charging scheme is shown in FIG. 1(b). The charging profile can also be designed to include other aspects, such as the minimization of the energy consumption during a charging cycle, or the minimization of the time specified for the charging process. A dc-dc-converter 15 can be connected in series to the dc bus of the rectifier of the receiver. The dc-to-dc-converter 15 is then connected to the battery via a low-pass filter 16 in order to eliminate the switching frequency ripple of the charging current. The converter is used to control either the battery current or the voltage applied to the battery according to the charging profile. Accordingly, the power that has to be transmitted from the transmitter to the receiver coil 4 is not constant, but depends on the state-of-charge of the battery 2. Because the transfer characteristics of the resonant system can exhibit a certain load dependency, the full-bridge inverter 9 at the transmitter side should be able to adapt to the actual load conditions. Additionally, the transfer characteristics of the resonant system can change due to a misalignment of the receiver coil 4 with respect to the transmitter coil 3 (cf. FIG. 4, 5), due to component tolerances, or due to parameter drifts. Hence, the full-bridge inverter 9 should also be able to adapt to the actual transfer characteristics due to these uncertainties.

According to known implementations, both adaptations can be realized by an adjustment of the inverter switching frequency. For example, if the resonance frequency is increased due to a coil misalignment, the actual resonant point should be tracked and the switching frequency should be increased accordingly in order to maintain a high efficiency. If the output power is reduced, the switching frequency should be shifted into a frequency region where the input impedance of the resonant system as seen at the output terminals of the full-bridge inverter is inductive in order to maintain a constant voltage at the output of the resonant circuit. While the switching frequency ensures Zero-Voltage Switching (ZVS) of the power semiconductors of the full-bridge inverter and leads to low switching losses, it causes additional conduction losses in the resonant circuit. Due to the inductive input characteristic of the resonant circuit, an increasing amount of reactive power is drawn from the full-bridge inverter in this operating mode. This results in reactive current components in both coils that cause conduction losses additional to those caused by the specified active component of the current.

Moreover, the current that has to be switched off by the semiconductors of the full-bridge inverter 9 can also be increased due to the reactive current components, which depending on the employed type of semiconductor can also cause additional switching losses. At the power and voltage levels of interest for EV battery charging, the Insulated-Gate Bipolar Transistor (IGBT) is often the preferred choice for the active power semiconductors as it offers a cost advantage and a high reliability. However, as described in G. Ortiz, H. Uemura, D. Bortis, J. W Kolar and O. Apeldoorn, *"Modeling of Soft-Switching Losses of IGBTs in High-Power High-Efficiency Dual-Active-Bridge DC/DC Converters,"* in *IEEE Trans. Electron Devices*, vol. 60, no. 2, pp. 587-597, February 2013, the charge stored in the junction of the IGBTs can lead to high tail-currents which can cause significant switching losses despite the ZVS conditions. In periods of low output power, the efficiency of the power conversion can be significantly lowered by these effects.

To supply the dc-bus 10 at the input of the full-bridge inverter 9 at the transmitter-side, a mains rectifier with Power Factor Correction (PFC) with an Electromagnetic Interference (EMI) filter is commonly used. Inductive charging systems designed for the power level of interest for EV battery charging can be fed from the three-phase mains. The structure of such an inductive charging system is shown in FIG. 1(a). A suitable converter topology comprises a mains rectifier 11 with three bridge legs that are connected to the three phases of the mains 1. To control the output voltage of the mains rectifier 11 the bridge legs are realized with active power semiconductor switches, such as IGBTs with anti-parallel diodes, and an inductor connected to each of the three input terminals of the PFC rectifier. A number of alternative converter topologies exist, possibly with fewer semiconductor switches or only a single inductor in the dc-link. A PFC rectifier can produce a controlled dc-voltage at a level above a certain minimum value given by the peak value of the mains line-to-line voltage while maintaining sinusoidal input currents in all three phases. It is therefore referred to as a boost-type PFC rectifier.

Other converter topologies exist that are able to produce output voltages below a certain maximum value given by the peak value of the mains voltage. These are commonly termed buck-type PFC rectifiers. An example is described in T. Nussbaumer, M. Baumann, J. W. Kolar, *"Comprehensive Design of a Three-Phase Three-Switch Buck-Type PWM Rectifier,"* in *IEEE Trans. Power Electronics*, vol. 22, no. 2, pp. 551-562, March 2007. As third alternative, for example CH 698 918 presents a buck+boost-type PFC rectifier, which allows supplying a dc-link voltage above or below the limit given by the peak value of the mains voltage. Of course, the same functionality can also be achieved by a boost-type PFC rectifier with a cascaded buck-converter, resulting in a boost+buck-type PFC rectifier. There exists a trade-off between the buck+boost-type and the boost+buck-type PFC rectifier structure in terms of the achievable conversion efficiency and power density of the converter, which should be taken into account together with the application and its specifications.

A variable dc-bus 10 voltage of the mains rectifier stage 11 provides another method to adapt to the variable load conditions on the receiver side. In this case, a change of the switching frequency of the full-bridge inverter can be omitted for the control of the output voltage and the switching frequency can, therefore, be constantly maintained at the resonant frequency of the tank, which results in a purely active current flow. This can significantly reduce the conduction losses in the semiconductor devices, the resonant capacitors, and in the transmitter coils. However, the switching losses of the power semiconductors of the full-bridge inverter can still be high due to high tail-currents of the IGBTs. They can present a limiting factor in the system design and make a compact realization of the converter difficult due to high cooling specifications. Additionally, for example in B. Goeldi, S. Reichert, and J. Tritschler, *"Design and Dimensioning of a Highly Efficient 22 kW Bidirectional Inductive Charger for E-Mobility,"* in *Proc. Int. Exhibition and Conf. for Power Electronics (PCIM Europe)*, 2013, pp. 1496-1503 the adjustable dc-bus voltage is produced by a dc-to-dc-converter connected in series to a PFC rectifier. While this structure offers a higher modularity, the system efficiency is reduced by the higher number of conversion stages. Additionally, the higher number of components for the cascaded system makes a compact realization of the system challenging.

SUMMARY

An exemplary inductive power transfer system for supplying electrical power from a transmitter-side subsystem connectable to a mains to a receiver-side subsystem connectable to a load is disclosed, the system comprising: a transmitter coil and a receiver coil; a transmitter-side power converter including a mains rectifier stage to power a transmitter-side dc-bus and arranged to control a transmitter-side dc-bus voltage $U_{1,dc}$ according to a corresponding reference value $U_{1,dc}^*$; a transmitter-side inverter stage with a controllable turn-off time of switches of the transmitter-side inverter stage to supply the transmitter coil with an alternating current; a receiver-side power converter having a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$; one or more power controllers arranged to determine a value that is indicative of a power transfer efficiency of the power transfer and to calculate, from this value indicative of the power transfer efficiency, the reference values $U_{1,dc}^*$, $U_{2,dc}^*$ for the transmitter-side dc-bus voltage $U_{1,dc}$ and the receiver-side dc-bus voltage $U_{2,dc}$; and an inverter stage switching controller arranged to control the turn-off time of the switches of the transmitter-side inverter stage to at least minimize switching losses in the transmitter-side inverter stage.

An exemplary transmitter side subsystem of an inductive power transfer system, connectable to a mains and being able to supply electrical power to a receiver-side subsystem is disclosed, the transmitter side subsystem comprising: a transmitter coil; a transmitter-side power converter including a mains rectifier stage to power a transmitter-side dc-bus and arranged to control a transmitter-side dc-bus voltage $U_{1,dc}$ according to a corresponding reference value $U_{1,dc}^*$, and a transmitter-side inverter stage with a controllable turn-off time of switches of the transmitter-side inverter stage to supply the transmitter coil with an alternating current; transmitter-side communication means for receiving the reference value $U_{1,dc}^*$ for the transmitter-side dc-bus voltage $U_{1,dc}$ from the receiver-side subsystem; and an inverter stage switching controller arranged to control the turn-off time of the switches of the transmitter-side inverter stage to at least minimize switching losses in the transmitter-side inverter stage transmitter-side inverter stag.

An exemplary receiver side subsystem of an inductive power transfer system is disclosed, the receiver-side subsystem being connectable to a load and being able to receive electrical power from a transmitter-side subsystem, the receiver-side subsystem comprising: a receiver coil; a receiver-side power converter including a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$; a receiver-side controller arranged to determine a value that is indicative of a power transfer efficiency of the power transfer and to calculate, from this value indicative of the power transfer efficiency, reference values $U_{1,dc}^*$, $U_{2,dc}^*$ for a transmitter-side dc-bus voltage $U_{1,dc}$ and the receiver-side dc-bus voltage $U_{2,dc}$; and receiver-side communication means for transmitting the reference value $U_{1,dc}^*$ for the transmitter-side dc-bus voltage $U_{1,dc}$ from the receiver-side subsystem to the transmitter-side subsystem.

An exemplary method for controlling an inductive power transfer system for supplying electrical power from a transmitter-side subsystem connectable to a mains to a receiver-side subsystem that is connectable to a load is disclosed, the inductive power transfer system that includes: a transmitter coil and a receiver coil; a transmitter-side power converter having a mains rectifier stage to power a transmitter-side dc-bus; a transmitter-side inverter stage with a controllable turn-off time of switches of the transmitter-side inverter stage to supply the transmitter coil with an alternating current; and a receiver-side power converter including a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$; the method comprising the steps of: determining a value that is indicative of a power transfer efficiency of the power transfer and calculating, from this value indicative of the power transfer efficiency, reference values $U_{1,dc}^*$, $U_{2,dc}^*$ for a transmitter-side dc-bus voltage $U_{1,dc}$ and a receiver-side dc-bus voltage $U_{2,dc}$, controlling the mains rectifier stage for the transmitter-side dc-bus voltage $U_{1,dc}$ of the transmitter-side dc-bus to follow the corresponding reference value $U_{1,dc}^*$; controlling the receiver-side charging converter for the receiver-side dc-bus voltage $U_{2,dc}$ of the receiver-side dc-bus to follow the corresponding reference value $U_{2,dc}^*$; and controlling the turn-off time of the switches of the transmitter-side inverter stage to at least minimize switching losses in the transmitter-side inverter stage transmitter-side inverter stage.

BRIEF DESCRIPTION OF THE DRAWINGS

In the following, the disclosure is described with examples of exemplary embodiments, which are presented in the attached figures. They show schematically.

In all the figures, similar parts or parts with a similar function are labelled with the same reference numeral.

DETAILED DESCRIPTION

Figure 1A:
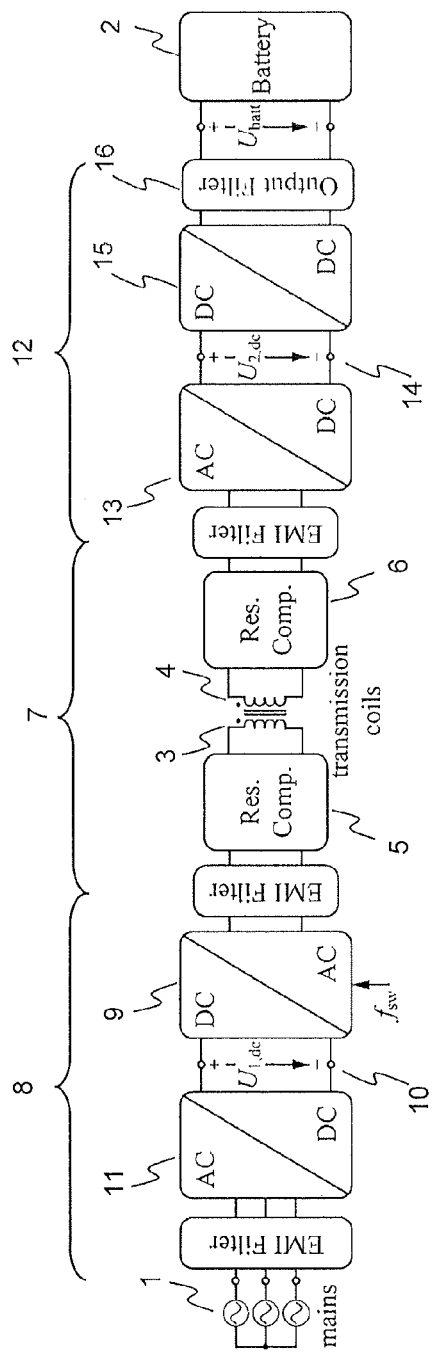
FIG. 1(a) illustrates a structure of an inductive charging system according to an exemplary embodiment of the disclosure.

Exemplary embodiments of the present disclosure provide a power transfer system, such as an inductive charging system, and a control method that lead to a high efficiency of the power transfer charging process in a wide range of operating conditions, output power and—for a charging system—state-of-charge dependent battery voltage. Exemplary embodiments of the present disclosure provides an inductive charging system that exhibits a large tolerance to coil misalignment and a high robustness with respect to component tolerances and parameter drifts.

An exemplary embodiment of the present disclosure is directed to an inductive power transfer system, such as a battery charging system, for supplying electrical power from a transmitter-side subsystem connectable to a mains to a receiver-side subsystem connectable to a load. The system includes a transmitter coil and a receiver coil, a transmitter-side power converter having a mains rectifier stage to power a transmitter-side dc-bus and arranged to control a transmitter-side dc-bus voltage $U_{1,dc}$ according to a corresponding reference value $U_{1,dc}^*$, a transmitter-side inverter stage with a controllable turn-off time of switches of the transmitter-side inverter stage to supply the transmitter coil with an alternating current (at a frequency equal to or close to a resonant frequency of the transmitter coil and receiver coil and any resonant compensations), a receiver-side power converter comprising a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$ (thereby controlling a charging current of the load), one or more power controllers arranged to determine a value that is indicative of a power transfer efficiency of the power transfer and to calculate, from this value indicative of the power transfer efficiency, the reference values $U_{1,dc}^*$, $U_{2,dc}^*$ for the transmitter-side dc-bus voltage $U_{1,dc}$ and the receiver-side dc-bus voltage $U_{2,dc}$, an inverter stage switching controller arranged to control the turn-off time of the switches of the transmitter-side inverter stage to at least approximately minimise switching losses in the transmitter-side inverter stage transmitter-side inverter stage.

The power transfer efficiency can be the ratio between the electrical power fed into the transmitter coil and the electrical power drawn from the receiver coil. One or both of these power values can be replaced, respectively, by the power drawn from the transmitter-side dc-bus and entering the transmitter-side inverter stage or by the power drawn from the receiver-side rectifier stage and entering the receiver-side dc-bus. Also other power values that can be measured along the chain of converters between the mains and the battery can be used for controlling and optimizing the power transfer efficiency.

The power controllers by controlling the two dc-bus voltages $U_{1,dc}$, $U_{2,dc}$ (two control variables) allow control of the power transfer efficiency and the power flow into the load (two state variables). The power flow into the load can be directly linked to the load current. The reference values $U_{1,dc}^*$, $U_{2,dc}^*$ can be computed to ensure that the power transfer efficiency is at a maximum.

If the value indicative of the power transfer efficiency is correct, e.g., if the value corresponds to the actual power transfer efficiency, then controlling the two dc-bus voltages $U_{1,dc}$, $U_{2,dc}$ to follow their reference values $U_{1,dc}^*$, $U_{2,dc}^*$ will result in the maximum power transfer efficiency, in addition to a desired power flow into the load.

If, however, the value indicative of the power transfer efficiency is not correct, then the reference values $U_{1,dc}^*$, $U_{2,dc}^*$ for the two dc-bus voltages will not result in a satisfactory power transfer, and according to another exemplary embodiment an ideal power transfer, where the power flow into the load can still be controlled to follow the desired power flow. The exemplary inverter stage switching controller as described herein compensates for this discrepancy and can bring the power transfer back to an ideal condition.

Thereby, the exemplary system of present disclosure reacts to changes in the resonant circuit due to a misalignment of the receiver coil with respect to the transmitter coil, due to component tolerances, or due to parameter drifts.

In other words, the transmitter-side dc-bus voltage can be regulated with the mains rectifier stage and the receiver-side dc-bus voltage can be regulated with the receiver-side charging converter such that the battery current follows its reference value while at the same time the power loss in the transmission and the receiver coil is minimized. The control (pre-calculated off-line or derived in real-time) is such that the reactive power supplied by the transmitter-side power converter is always small and the efficiency of the power conversion is high, also during phases of reduced output power.

Furthermore, the frequency of the alternating current in the transmitter coil can be regulated to compensate for changes in the resonant circuit due to coil misalignment, component tolerances, or parameter drifts. This has the advantage that the switching conditions of the power semiconductors of the transmitter-side inverter stage can be controlled such that the switching power loss is minimized.

The control can be realized in a way that the only specified variable that should be transmitted via the communication channel is a reference value and not a measurement, which makes the system highly robust.

In summary, an acceptable, or in another exemplary embodiment, ideal transmission can be achieved if the switching frequency is regulated to follow the resonant frequency of the IPT link and the two dc-link voltages $U_{1,dc}$ and $U_{2,dc}$ are used to control the output power.

The transmitter and receiver can be distanced by an air gap. This can be the case if the disclosure is applied to an inductive charging system. The disclosure allows compensating for parameter changes in the coupling between the transmitter and receiver coils, and for other parameters as well.

According to another exemplary embodiment, the transmitter and receiver can be part of a transformer. Stray inductances of the transformer are compensated by capacitances at the transmitter and/or receiver side, forming a resonant circuit. Exemplary embodiments of the present disclosure allow compensating for parameter changes due to ageing, temperature change, or other conditions as desired. The remaining explanations are in terms of an inductive charging system, but it is understood that they can be applied to other isolated DC-DC converters as well, and with other loads than batteries.

If the coils of the power transfer system are part of an ordinary transformer, then the transmitter and receiver side subsystems, including the various controllers, can be part of the same physical device.

If, however, the transmitter and receiver side subsystems are part of an inductive charging system, then these subsystems can be implemented as separate devices, and such a communication channel should be provided. This communication channel can be used to transmit the reference value $U_{1,dc}^*$, as mentioned above. Furthermore, for an ideal implementation information from the transmitter-side subsystem, such as the magnetic coupling k or the input power $P_{in}$, is specified at the receiver-side subsystem. However, the latter information depends on parameters that change slowly—with time constants in the range of minutes-to-hours-to-days—and so any constraints on communication from the transmitter-side to the receiver-side subsystem are low.

According to an exemplary embodiment of the present disclosure, the receiver side subsystem can include a receiver-side resonant compensation that with the receiver coil forms a resonant circuit having a resonant frequency. The system can also include, in addition to or instead of the receiver-side resonant compensation, a transmitter-side resonant compensation at the transmitter coil that reduces the reactive power demand of the resonant circuit at the resonant frequency.

According to an exemplary embodiment described herein, the inductive power transfer system includes a communication channel for transmitting the reference value $U_{1,dc}^*$ for the transmitter-side dc-bus voltage $U_{1,dc}$ from the receiver-side subsystem to the transmitter-side subsystem.

In an embodiment, the value that is indicative of the power transfer efficiency is a magnetic coupling (k) between the transmitter coil and receiver coil.

According to another exemplary embodiment, the value that is indicative of the power transfer efficiency is computed from a measurement of an input power $P_{in}$ input into the transmitter-side inverter stage or the transmitter coil and a measurement of a received power $P_{out}$ that is output by the receiver coil or the receiver-side rectifier stage.

According to still another exemplary embodiment, at least one of the reference values $U_{1,dc}^*$, $U_{2,dc}^*$ for the transmitter-side dc-bus voltage $U_{1,dc}$ and the receiver-side dc-bus voltage $U_{2,dc}$ is determined from a look-up table wherein reference values obtained from an off-line calculation are stored in function of transmitter and receiver coil currents and the switching frequency $f_{sw}$ of the transmitter-side inverter stage.

According to an exemplary embodiment of the present disclosure, the one or more power controllers can be configured to compute the reference value $U_{2,dc}*$ for the receiver-side dc-bus voltage $U_{2,dc}$ from a measured difference between a load current $I_{batt}$ and a reference value $I_{batt}*$ for the load current; and to compute the reference value $U_{1,dc}*$ for the transmitter-side dc-bus voltage $U_{1,dc}$ from the reference value $I_{batt}*$ for the load current and a measured value of the load voltage $U_{batt}$.

The functionality of the one or more power controllers can be implemented in a single controller or distributed over several controllers. For example, the receiver-side controller can determine both reference values $U_{1,dc}*$, $U_{2,dc}*$ and transmit the reference value $U_{1,dc}*$ for the transmitter-side dc-bus voltage $U_{1,dc}$ to a transmitter-side controller. Alternatively, the receiver-side controller can compute an intermediate value and communicate it to the transmitter-side controller, which then computes the final reference value.

According to yet another exemplary embodiment, the inverter stage switching controller is arranged to control the transmitter-side inverter stage in an inductive region close to the resonant frequency $f_0$ of the transmitter for a switch-off current $i_{1,off}$, corresponding to a value of the transmitter coil current $i_1(t)$ at the time of commutation, that is at a value that minimizes a switching loss of the transmitter-side inverter stage.

According to another exemplary embodiment, the inverter stage switching controller is arranged to control the turn-off time of the switches of the transmitter-side inverter stage for a switch-off current $i_{1,off}$ to follow a switch-off current reference value.

The acceptable, or according to another exemplary embodiment, ideal value of the switched current $i_{1,off}$ that minimizes the switching loss of the power semiconductor can be estimated in real-time from a mathematical model of the power semiconductor, or from a look up table, given a measurement of the transmitter coil current $i_1(t)$, the switching frequency $f_{sw}$, and the transmitter-side dc-bus voltage $U_{1,dc}$.

According to an exemplary embodiment of the present disclosure, the inverter stage switching controller can be arranged to estimate a power loss in the semiconductor switches of the transmitter-side inverter stage and to perform an iterative search procedure, varying the turn-off time of the switches, to minimize the power loss.

In an exemplary embodiment, the inverter stage switching controller can be arranged to control the turn-off time of the switches of the transmitter-side inverter stage for the transmitter coil current $i_1(t)$ to have a constant phase shift relative to the output voltage $u_1(t)$ of the transmitter-side inverter stage An exemplary transmitter side subsystem of an inductive power transfer system of the present disclosure can be connectable to a mains and being able to supply electrical power to a receiver-side subsystem, includes a transmitter coil, a transmitter-side power converter having a mains rectifier stage to power a transmitter-side dc-bus and arranged to control a transmitter-side dc-bus voltage $U_{1,dc}$ according to a corresponding reference value $U_{1,dc}*$, and a transmitter-side inverter stage with a controllable turn-off time of switches of the transmitter-side inverter stage to supply the transmitter coil with an alternating current, transmitter-side communication (e.g., a transmitter, receiver, or transceiver) means for receiving the reference value $U_{1,dc}*$ for the transmitter-side dc-bus voltage $U_{1,dc}$ from the receiver-side subsystem, an inverter stage switching controller arranged to control the turn-off time of the switches of the transmitter-side inverter stage to at least approximately minimize switching losses in the transmitter-side inverter stage transmitter-side inverter stage.

An exemplary receiver side subsystem of an inductive power transfer system of the present disclosure can be connectable to a load and being able to receive electrical power from a transmitter-side subsystem, includes a receiver coil, a receiver-side power converter having a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}*$, a receiver-side controller arranged to determine a value that is indicative of a power transfer efficiency of the power transfer and to calculate, from this value indicative of the power transfer efficiency, reference values $U_{1,dc}*$, $U_{2,dc}*$ for a transmitter-side dc-bus voltage $U_{1,dc}$ and the receiver-side dc-bus voltage $U_{2,dc}$, and a receiver-side communication means for transmitting the reference value $U_{1,dc}*$ for the transmitter-side dc-bus voltage $U_{1,dc}$ from the receiver-side subsystem to the transmitter-side subsystem.

The exemplary method serves for controlling an inductive power transfer system, such as a battery charging system, for supplying electrical power from a transmitter-side subsystem connectable to a mains to a receiver-side subsystem connectable to a load, the inductive power transfer system including a transmitter coil and a receiver coil, a transmitter-side power converter including a mains rectifier stage to power a transmitter-side dc-bus, a transmitter-side inverter stage with a controllable turn-off time of switches of the transmitter-side inverter stage to supply the transmitter coil with an alternating current and a receiver-side power converter having a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}*$.

According to an exemplary embodiment of the present disclosure, the method includes the steps of determining a value that is indicative of a power transfer efficiency of the power transfer and calculating, from this value indicative of the power transfer efficiency, reference values $U_{1,dc}*$, $U_{2,dc}*$ for a transmitter-side dc-bus voltage $U_{1,dc}$ and a receiver-side dc-bus voltage $U_{2,dc}$; controlling the mains rectifier stage for the transmitter-side dc-bus voltage $U_{1,dc}$ of the transmitter-side dc-bus to follow the corresponding reference value $U_{1,dc}*$; controlling the receiver-side charging converter for the receiver-side dc-bus voltage $U_{2,dc}$ of the receiver-side dc-bus to follow the corresponding reference value $U_{2,dc}*$; controlling the turn-off time of the switches of the transmitter-side inverter stage to at least approximately minimize switching losses in the transmitter-side inverter stage transmitter-side inverter stage.

According to exemplary embodiments described herein, the turn-off time of the switches of the transmitter-side inverter stage can be controlled by controlling the switching frequency $f_{sw}$ of the transmitter-side inverter stage, by controlling the duty-cycle of the voltages applied by the transmitter-side inverter stage, or by a combination of both.

Figure 2A:
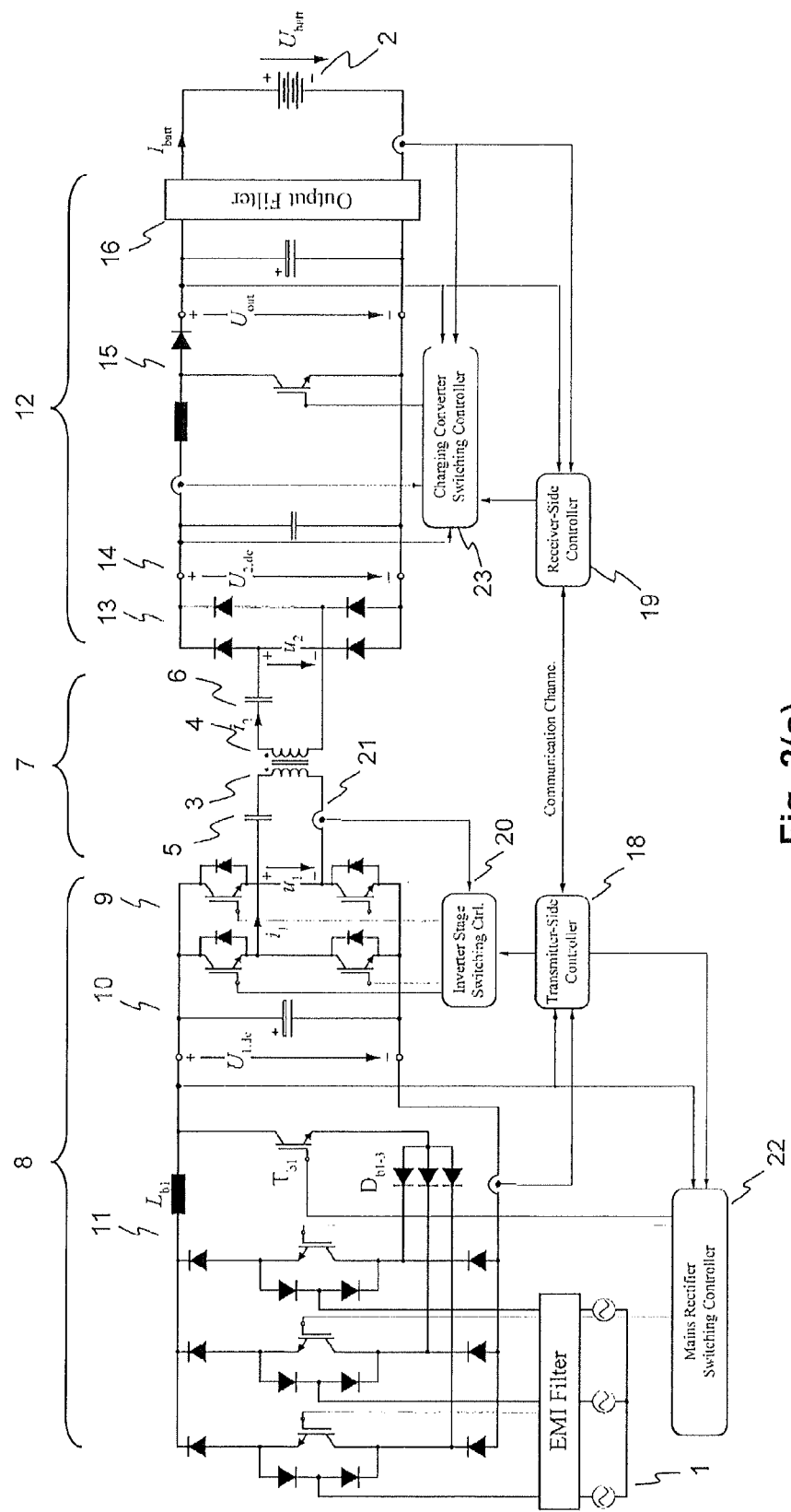
FIG. 2(a) illustrates charging system having a mains rectifier stage realized as a buck+boost-type rectifier with three active power semiconductor switches, the transmitter-side inverter stage is realized as a two-level full-bridge inverter, the receiver-side rectifier stage is realized as a diode bridge, and the receiver-side charging converter is realized as a cascaded boost-converter according to an exemplary embodiment of the disclosure.

FIG. 2(a) illustrates charging system having a mains rectifier stage realized as a buck+boost-type rectifier with three active power semiconductor switches, the transmitter-side inverter stage is realized as a two-level full-bridge inverter, the receiver-side rectifier stage is realized as a diode bridge, and the receiver-side charging converter is realized as a cascaded boost-converter according to an exemplary embodiment of the disclosure. As shown in FIG. 2(a): an inductive charging system transmits a charging power from a mains 1 to a battery 2. A transmitter coil 3 and a receiver coil 4 are employed for the contactless transmission of the charging power across an air gap by a magnetic flux. A transmitter-side resonant compensation 5 is connected to the transmitter coil 3. The transmitter-side resonant compensation 5 includes at least one resonant capacitor which can be connected to the transmitter coil 3 in series. The at least one resonant capacitor of the transmitter-side resonant compensation 5 can have a number of individual capacitors connected in parallel and/or in series. A receiver-side resonant compensation 6 is connected to the receiver coil 4. The receiver-side resonant compensation 6 includes at least one resonant capacitor that can be connected to the receiver coil 4 in series. The at least one resonant capacitor of the receiver-side resonant compensation 6 can have a number of individual capacitors connected in parallel and/or in series.

According to an exemplary embodiment of the present disclosure, the at least one resonant capacitor of the receiver-side resonant compensation 6 is connected to the receiver coil 4 in parallel, while the functionality of the disclosure remains unchanged. Together with the transmitter coil 3 and the receiver coil 4, the transmitter-side resonant compensation 5 and the receiver-side resonant compensation 6 form a resonant circuit 7 with a resonant frequency $f_0$ at which an input impedance of the resonant circuit 7 is ohmic. Connected to the transmitter-side resonant compensation 5 is a transmitter-side power converter 8. The transmitter-side power converter 8 includes a transmitter-side inverter stage 9, a transmitter-side dc-bus 10 with a transmitter-side dc-bus voltage $U_{1,dc}$ and a mains rectifier stage 11 connected to the transmitter-side dc-bus 10 and the mains 1.

According to the exemplary embodiment shown in FIG. 2(a), the mains rectifier stage 11 is realized as a buck+boost-type rectifier, which is used to supply the inductive charging system from the mains 1. The transmitter-side inverter stage 9 is realized as a two-level full-bridge inverter. The buck+boost-type rectifier includes an active bridge leg with one active power semiconductor and four power diodes for each phase of the mains 1. Additionally, the buck+boost-type rectifier includes a boost-inductor $L_{b1}$ connected between the bridge legs and the dc-bus, a boost-switch $T_{b1}$, and three additional diodes $D_{b1\text{-}3}$ that enable a boost mode of the buck+boost-type rectifier. The mains rectifier stage 11 can also have an Electromagnetic Interference (EMI) filter at the connection to the mains 1.

Connected to the receiver-side resonant compensation 6 is a receiver-side power converter 12. The receiver-side power converter 12 includes a receiver-side rectifier stage 13, a receiver-side dc-bus 14 with a receiver-side dc-bus voltage $U_{2,dc}$, a receiver-side charging converter 15, and an output filter 16. Connected to the receiver-side power converter 12 at the output filter 16 is the battery 2. An inductive part of the output filter 16 can be realized either by an explicit or discrete inductor or alternatively by an inductance of a connection cable between the receiver-side charging converter 15 and the battery 2. According to an exemplary embodiment, additional filter elements to reduce a stray field can be connected between the transmitter-side power converter 8 and the transmitter-side resonant compensation 5 or between the receiver-side power converter 9 and the receiver side resonant compensation 6. A battery voltage $U_{batt}$ and a battery current $I_{batt}$ are measured on the receiver-side power converter 12. A battery power $P_{batt}$ that is, the power flowing into the battery, can be calculated from the battery voltage $U_{batt}$ and the battery current $I_{batt}$. A communication channel 17 can provide communication between a transmitter-side controller 18 and a receiver-side controller 19. The communication channel can be a wireless communication channel, while other realizations are also possible.

The transmitter-side inverter stage 9 of the transmitter-side power converter 8 is switched by an inverter stage or transmission side switching controller 20 at a switching frequency $f_{sw}$ close to or at the resonant frequency $f_0$ of the resonant circuit 7. FIG. 3 illustrates waveforms of the output voltage of the transmitter-side power converter, the current in the transmitter coil, and the current in the receiver coil for the charging systems shown in FIG. 2(a) and FIG. 2(b) according to an exemplary embodiment of the disclosure. A transmitter coil current measurement 21 is used to measure a transmitter coil current $i_1(t)$ and to determine the resonant frequency $f_0$, at which the transmitter coil current $i_1(t)$ is in phase with an output voltage $u_1(t)$ of the transmitter-side inverter stage 9 and, thus, the input impedance of the resonant circuit 7 is ohmic.

The transmitter coil current measurement 21 can include an electrical circuit to detect the zero-crossings of the transmitter coil current $i_1(t)$, which can be used to trigger an integrator or counter of the transmitter-side controller 20. The integrator is reset at each zero-crossing. From the integrator value before the reset, which is proportional to the elapsed time between zero-crossings, an oscillation frequency of the transmitter coil current $i_1(t)$ can be determined from which the resonant frequency $f_0$ can be estimated. The switching frequency $f_{sw}$ is regulated by the inverter stage switching controller 20 in an inductive region close to the resonant frequency $f_0$ such that a switched current $i_{1,off}$, which corresponds to a value of the transmitter coil current $i_1(t)$ at the time of a commutation as shown in FIG. 3, is at an acceptable, or according to another exemplary embodiment, ideal value that minimizes a switching loss of the transmitter-side inverter stage 9. At the switching transition, the charge that is removed from the IGBT by the collector current during the interlock time is controlled to be equal to the charge that is stored in the IGBT junction in order to completely eliminate the turn-on losses of the complementary device. The acceptable, or according to another exemplary embodiment, ideal switching angle can also be calculated.

The acceptable, or according to another exemplary embodiment, ideal value of the switched current $i_{1,off}$ that minimizes the switching loss of the transmitter-side inverter stage 9 can be estimated in real-time with a mathematical model of the power semiconductor based on the transmitter coil current measurement 21, the switching frequency $f_{sw}$, and the transmitter-side dc-bus voltage $U_{1,dc}$.

According to another exemplary embodiment of the present disclosure, the acceptable, or according to another exemplary embodiment, ideal value of the switched current $i_{1,off}$ can be determined in real-time by a power loss estimation and an iterative search method. The estimation can be based on the temperature of the switches or on measurements of voltages and currents at the switches or from a difference of the power delivered by the transmitter-side dc-bus 10 and the power absorbed by the transmitter coil 3.

According to yet another exemplary embodiment, a current look-up table can be used, where the acceptable, or according to another exemplary embodiment, ideal value of the switched current $i_{1,off}$ is pre-calculated and stored, in function of the transmitter coil current $i_1(t)$, the switching frequency $f_{sw}$, and the transmitter-side dc-bus voltage $U_{1,dc}$.

Still, according to another exemplary embodiment of the present disclosure, an acceptable, or according to another exemplary embodiment, ideal phase angle between $i_1(t)$ and $u_1(t)$ can be pre-calculated and used to control the switching frequency that leads to this phase angle. The acceptable or ideal phase angle is not dependent on operating conditions of the inverter stage.

In addition to or instead of adapting the switching frequency $f_{sw}$, a duty cycle time for the output voltage $u_1(t)$ of the transmitter-side inverter stage 9 can be adapted in order to set the switch-off time and the switch-off current.

A mains rectifier switching controller 22 of the mains rectifier stage 11 is used by the transmitter-side controller 18 to regulate the transmitter-side dc-bus voltage $U_{1,dc}$ by space-vector or phase-oriented control techniques according to known implementations. To perform this regulation, the transmitter-side controller 18 uses the communication channel 17 to receive information about a reference value $U_{1,dc}^*$ for the transmitter-side dc-bus voltage $U_{1,dc}$ from the receiver-side controller 19.

Figure 1B:
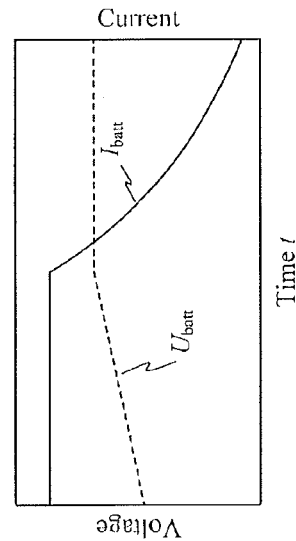
FIG. 1(b) illustrates a battery current and battery voltage profile during a charging process according to an exemplary embodiment of the disclosure.

The battery current $I_{batt}$ is controlled by the receiver-side controller 19 using a charging converter switching controller 23 of the receiver-side charging converter 15 according to a reference value $I_{batt}^*$, which can be obtained from a charging profile similar to the one shown in FIG. 1(b). The charging profile is known, according to the type of the battery. To control the battery current $I_{batt}$ in an outer control-loop, the receiver-side dc-bus voltage $U_{2,dc}$ is regulated to a reference value $U_{2,dc}^*$ in an inner control-loop. This is possible because the battery 2 provides a stable voltage source at the output of the receiver-side charging converter 15.

It can be shown that for a series-series compensated inductive power transfer system between the transmitter-side dc-bus 10 and the receiver-side dc-bus 14 the maximum transmission efficiency at the angular resonant frequency $\omega_0 = 2\pi f_0$ is achieved by choosing the reactance of the receiver coil to be $$\omega_0 L_2 \approx \frac{R_{L,eq}}{k_0} \qquad (1)$$

and the transmitter coil self-inductance to be $$L_1 = L_2 \left(\frac{U_{1,dc}}{U_{2,dc}}\right)^2 \qquad (2)$$

where $k_0$ denotes the magnetic coupling at the nominal position of the coils. This design ensures an acceptable, or according to another exemplary embodiment, ideal matching of the receiver coil to the equivalent resistance of the load at the nominal point, which is given by $$R_{L,eq} = \frac{8}{\pi^2} \frac{U_{2,dc}^2}{P_2} \qquad (3)$$

for a diode rectifier with a capacitive output filter. The resonant frequency is set by choosing the capacitances for the transmitter and the receiver side resonant compensation as $$C_1 = \frac{1}{\omega_0^2 L_1}$$

and $$C_2 = \frac{1}{\omega_0^2 L_2}.$$

It furthermore can be shown that for a series-series compensated inductive power transfer system the output power $P_2$ is $$P_2 = \frac{8}{\pi^2} \frac{U_{1,dc} U_{2,dc}}{\omega_0 L_h} \qquad (4)$$

and therefore, if the dc-link voltages are controlled, the battery current can be regulated according to $$I_{batt} = \frac{8}{\pi^2} \frac{1}{\omega_0 L_h} \frac{U_{1,dc} U_{2,dc}}{U_{batt}} \qquad (5)$$

because the battery is a voltage-impressing element and the battery current results from $I_{batt} = P_2/U_{batt}$.

The condition for the maximum efficiency of the IPT system is that the receiver reactance is matched to the equivalent load resistance (3) according to (1). Hence, if the receiver-side dc-link voltage can be controlled according to $$U_{2,dc}^* = \sqrt{\frac{\pi^2}{8} \omega_0 L_2 k P_2} \qquad (6)$$

(given the actual magnetic coupling k), at reduced output power, the equivalent load resistance is maintained constant and the matching condition is fulfilled. Because of the symmetry of (4), it is sufficient if a feedback controller is used to adapt one of the reference values of the dc-link voltages dynamically to compensate for inaccuracies in the model and the calculations. The reference value for the primary dc-link voltage follows from (2) as $$U_{1,dc}^* = \sqrt{\frac{L_1}{L_2}} U_{2,dc}^* \qquad (7)$$

Figure 4A:
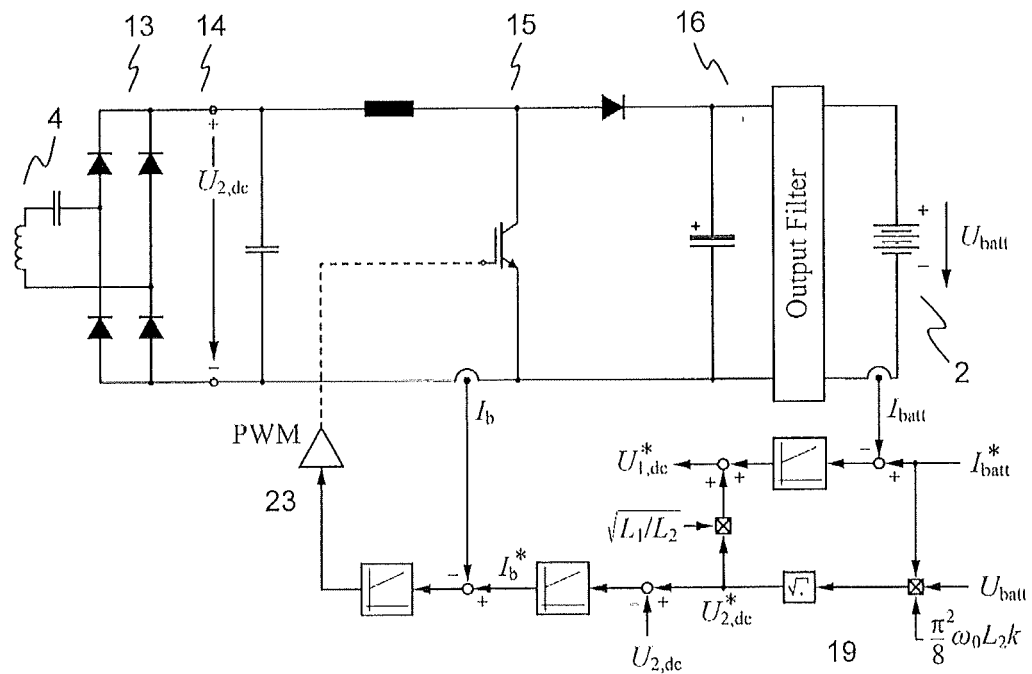
FIG. 4(a)-(c) illustrates block diagrams of three embodiments of the control method according to an exemplary embodiment of the disclosure.
Figure 4B:
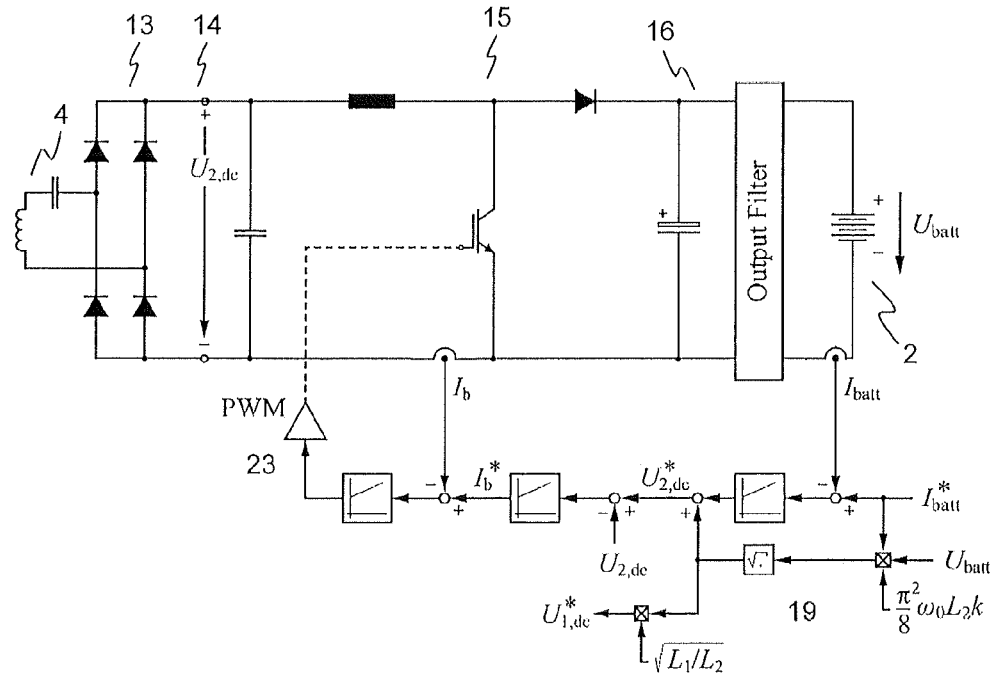
Figure 4C:
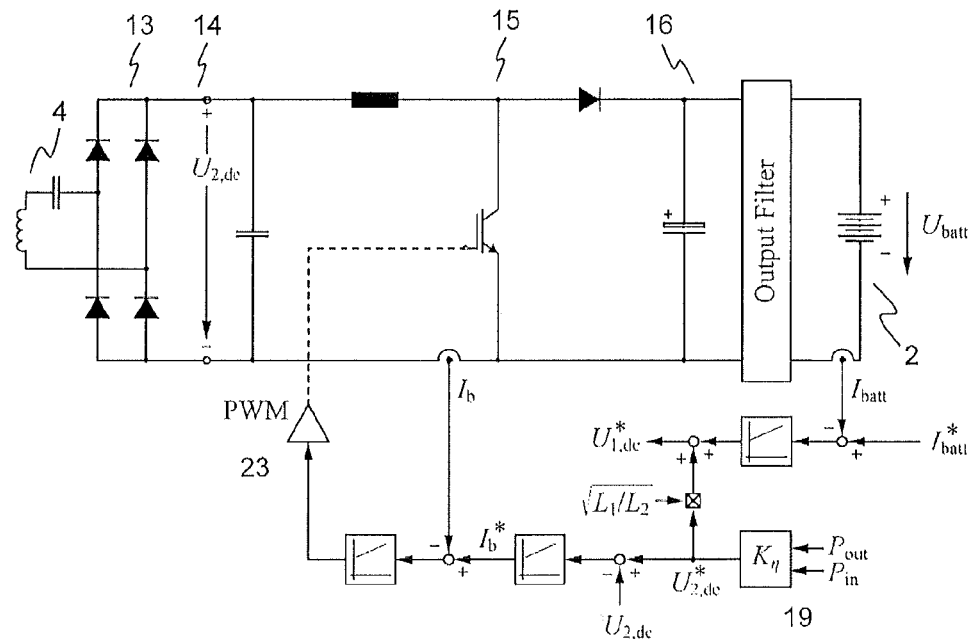

In summary, the battery power $P_{batt}$ is a function of a product of the transmitter-side dc-bus voltage $U_{1,dc}$ and the receiver-side dc-bus voltage $U_{2,dc}$, hence, the battery power can be controlled by adapting either of the dc-bus voltages. Therefore, three different control methods are possible:

FIG. 4(a)-(c) illustrates block diagrams of three embodiments of the control method according to an exemplary embodiment of the disclosure. As shown in FIG. 4(a), a controller can be used to adapt the reference value $U_{1,dc}^*$ for the transmitter-side dc-bus voltage $U_{1,dc}$ based on a measured difference between the reference value $I_{batt}^*$ and the battery current $I_{batt}$. The reference value $U_{2,dc}^*$ can be calculated based on a mathematical model which describes the power transfer, as shown above. A cascaded controller according to methods known from prior art can then be used to regulate the receiver-side dc-bus voltage $U_{2,dc}$ to the reference value $U_{2,dc}^*$ with the receiver-side charging converter 15. The reference value $U_{2,dc}^*$ can also be added as a feed-forward to the reference value $U_{1,dc}$ of the transmitter-side dc-bus voltage $U_{1,dc}$.

According to another exemplary embodiment, as shown in FIG. 4(b), a controller can be used to adapt the reference value $U_{2,dc}^*$ for the receiver-side dc-bus voltage $U_{2,dc}$ based on the measured difference between the reference value $I_{batt}^*$ and the battery current $I_{batt}$. The reference value $U_{1,dc}^*$ can be calculated based on the mathematical model of equations (4), (5) and (6) which describes the power transfer. A cascaded controller according to methods known from prior art can then be used to regulate the transmitter-side dc-bus voltage $U_{1,dc}$ to the reference value $U_{1,dc}^*$ with the mains rectifier stage 11. The reference value $U_{1,dc}^*$, or an equivalent value transformed to the receiver side, can also be used to derive a feed-forward signal which can be added to the output of the controller for the receiver-side dc-bus voltage $U_{2,dc}$. This feed forward value is the theoretical acceptable, or according to another exemplary embodiment, ideal value $U_{2,dc}*$ for the receiver-side dc-bus voltage $U_{2,dc}$ and is related to the reference value $U_{1,dc}*$ by equation (6). Consequently, the controller adapting the reference value $U_{2,dc}*$ should only correct for deviations from the theoretical acceptable, or according to another exemplary embodiment, ideal value due to a model mismatch, for example.

According to yet another exemplary embodiment, as shown in FIG. 4(c), a controller can be used to adapt the reference value $U_{1,dc}*$ for the transmitter-side dc-bus voltage $U_{1,dc}$ based a measured difference between the reference value $I_{batt}*$ and the battery current $I_{batt}$ while the reference value $U_{2,dc}*$ is calculated by another controller based on a measured difference between an input power $P_{in}$ input into the transmitter-side inverter stage 9 or the transmitter coil 3 and a received power $P_{out}$ that is output by and, for example, also measured at the receiver coil 4 or at the receiver-side rectifier stage 13. In real-time, a power difference between the input power $P_{in}$ and the received power $P_{out}$ can by observed while the reference value $U_{1,dc}*$ and the reference value $U_{2,dc}*$ are adjusted by the controllers until the power difference is minimized and the battery current $I_{batt}$ is regulated to the reference value $I_{batt}*$.

Figure 5:
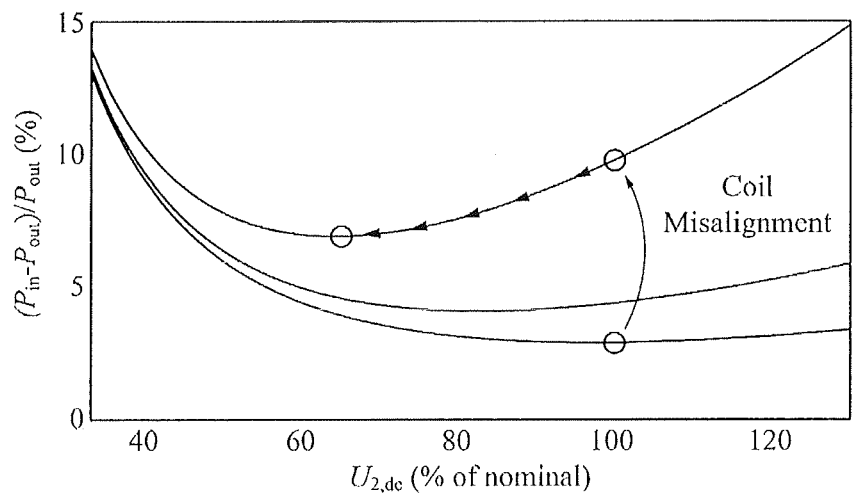
FIG. 5 illustrates dependency of the power loss in the transmitter and the receiver coil as a function of the receiver-side dc-bus voltage $U_{2,dc}$ according to an exemplary embodiment of the disclosure.

FIG. 5 illustrates dependency of the power loss in the transmitter and the receiver coil as a function of the receiver-side dc-bus voltage $U_{2,dc}$ according to an exemplary embodiment of the disclosure. As shown in FIG. 5, an acceptable, or according to another exemplary embodiment, ideal value exists for the receiver-side dc-bus voltage $U_{2,dc}$ where the relative difference between the input power $P_{in}$ and the received power $P_{out}$ is minimized. If changes in the resonant circuit 7 due to a misalignment of the receiver coil 4 with respect to the transmitter coil 3, due to component tolerances, or due to parameter drifts occur, the acceptable, or according to another exemplary embodiment, ideal value changes and the receiver-side dc-bus voltage $U_{2,dc}$ is, therefore, adjusted by the controllers.

In the control methods in which the transmitter-side dc-bus voltage $U_{1,dc}$ is adapted with the PI-controller instead of the receiver-side dc-bus voltage $U_{2,dc}$ the reaction time of the battery current control loop will likely be lower, due to the delay that is introduced by the communication across the air gap. Therefore, according to an exemplary embodiment of the present disclosure, this control loop and critical parts (overheating, overcurrent and overvoltage protection) of the battery charging control are implemented on the receiver, which has a more direct access to the measurements.

To calculate the reference values (6) and (7) accurately, an estimate of the magnetic coupling k should be generated. If a feedback controller is used, also a pre-calculated, approximate value can be used and the controller will compensate for the estimation error. Additionally or alternatively, the magnetic coupling can be estimated in real time, for example, from measurements of the currents in the coils and an equivalent circuit.

According to another exemplary embodiment, the reference value $U_{1,dc}*$ and the reference value $U_{2,dc}*$ can be determined from a voltage look-up table where the reference values obtained from an off-line calculation are stored in function of the transmitter and receiver coil currents and the switching frequency $f_{sw}$ of the transmitter-side inverter stage.

The minimum communication for the acceptable, or according to another exemplary embodiment, ideal control is the transmission of the reference value $U_{1,dc}*$ for the transmitter-side dc-bus voltage $U_{1,dc}$, which makes the system highly robust to a failure of the communication channel 17. If communication is lost, $U_{1,dc}$ remains constant, then this will be compensated for by the voltage controller on the receiver side.

Figure 6:
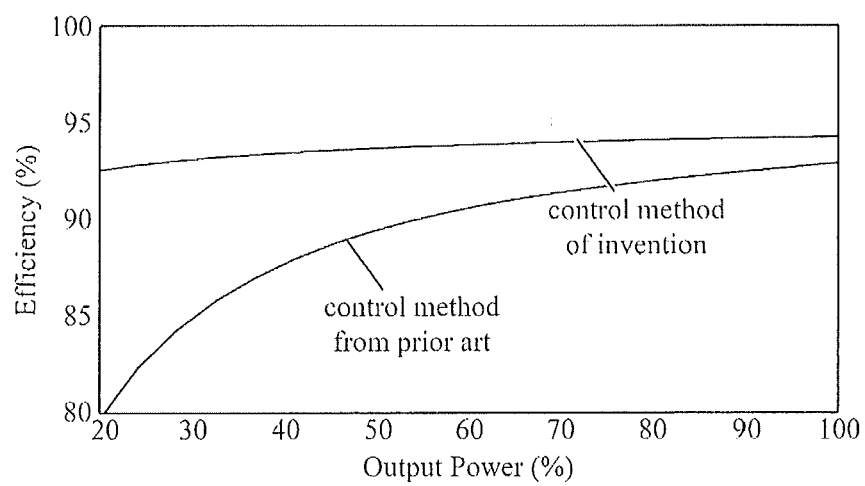
FIG. 6 illustrates power transfer efficiency as compared to the efficiency of an inductive charging system with a fixed dc-bus voltage and a frequency control method according to an exemplary embodiment of the disclosure.

FIG. 6 illustrates power transfer efficiency as compared to the efficiency of an inductive charging system with a fixed dc-bus voltage and a frequency control method according to an exemplary embodiment of the disclosure. A comparison of an efficiency of the power transfer that is achieved by the exemplary embodiments of the present disclosure to the efficiency of an inductive charging system with a fixed dc-bus voltage and a frequency control method according to known implementations, as shown in FIG. 6, illustrates the advantage of the present disclosure.

Figure 7:
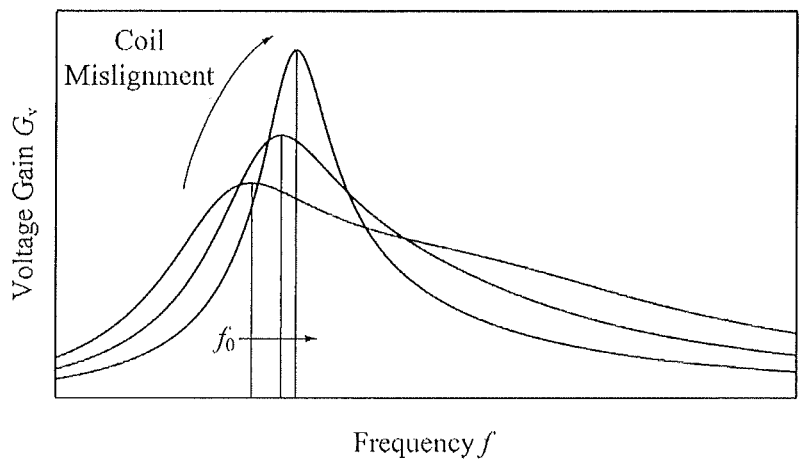
FIG. 7 illustrates voltage gain $G_v = |U_{2,dc}/U_{1,dc}|$ as a function of frequency for the charging systems shown in FIG. 2(a) and FIG. 2(b), indicating the effect of a coil misalignment according to an exemplary embodiment of the disclosure.
Figure 8:
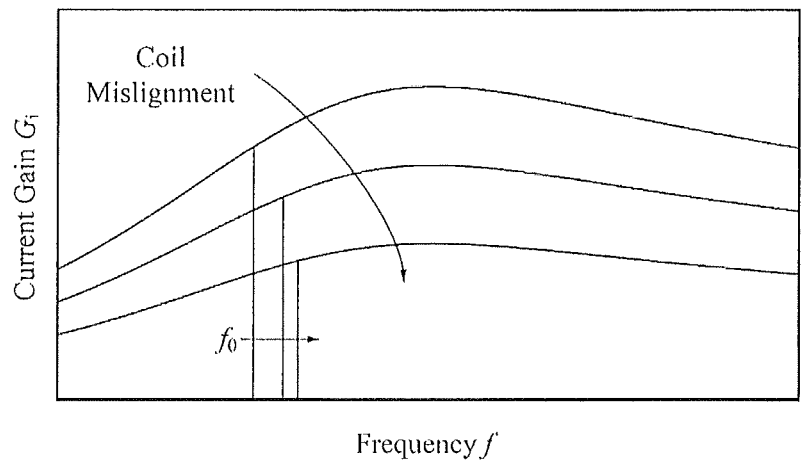
FIG. 8 illustrates current gain $G_i = |\hat{I}_2/\hat{I}_1|$ as a function of frequency for the charging systems shown in FIG. 2(a) and FIG. 2(b), indicating the effect of a coil misalignment according to an exemplary embodiment of the disclosure.

According to the exemplary methods of the present disclosure, the transmitter-side dc-bus voltage $U_{1,dc}$, the receiver-side dc-bus voltage $U_{2,dc}$, and/or the switching frequency $f_{sw}$ are regulated to compensate for changes in the resonant circuit 7 due to a misalignment of the receiver coil 4 with respect to the transmitter coil 3, due to component tolerances, or due to parameter drifts. FIG. 7 illustrates voltage gain $G_v=|U_{2,dc}/U_{1,dc}|$ as a function of frequency for the charging systems shown in FIG. 2(a) and FIG. 2(b), indicating the effect of a coil misalignment according to an exemplary embodiment of the disclosure. FIG. 8 illustrates current gain $G_i=|\hat{I}_2/\hat{I}_1|$ as a function of frequency for the charging systems shown in FIG. 2(a) and FIG. 2(b), indicating the effect of a coil misalignment according to an exemplary embodiment of the disclosure.

As shown in FIG. 7 and FIG. 8, the changes can include a voltage gain $G_v=|U_{2,dc}/U_{1,dc}|$, which is higher than expected and a current gain $G_i=|\hat{I}_2/\hat{I}_1|$, which is lower than expected. As a compensation, depending on the chosen control method, the transmitter-side dc-bus voltage $U_{1,dc}$ and/or the receiver-side dc-bus voltage $U_{2,dc}$ is adjusted such that the battery current $I_{batt}$ is regulated to its reference value $I_{batt}*$ despite the coil misalignment. Additionally, the switching frequency $f_{sw}$ is increased or decreased as well, for example if a limit of a control range of the transmitter-side dc-bus voltage $U_{1,dc}$ or the receiver-side dc-bus voltage $U_{2,dc}$ is reached. Moreover, the changes in the resonant circuit 7 can include that the resonant frequency $f_0$ deviates from an expected value. This change is detected with the transmitter coil current measurement 21 as described above and the switching frequency $f_{sw}$ is adjusted such that it remains in the inductive region close to the resonant frequency $f_0$ and that the switched current $i_{1,off}$ stays at or close to its acceptable, or according to another exemplary embodiment, ideal value that minimizes the switching loss of the transmitter-side inverter stage 9.

In another exemplary embodiment having the same electrical circuit and functionality as either of the previously described embodiments, an on-time $t_{on}$ as shown in FIG. 3, during which the transmitter-side dc-bus voltage $U_{1,dc}$ is applied to the resonant circuit 7 by the transmitter-side inverter stage 9, is adapted in addition to the switching frequency $f_{sw}$ according to a duty-cycle control method. Due to the duty-cycle control method, the on-time $t_{on}$ can be less than one half of a switching period $T_{sw}=1/f_{sw}$. The switching frequency $f_{sw}$ can be adapted such that the transmitters coil current $i_1(t)$ during a turn-on of a power semiconductor in a bridge-leg of the transmitter-side inverter stage 9 is always such that a turn-on switching loss is small. The on-time $t_{on}$ can be such that the acceptable, or according to another exemplary embodiment, ideal value of the switched current $i_{1,off}$ is achieved and a switching loss during a turn-off of a power semiconductor in a bridge-leg of the transmitter-side inverter stage 9 is small. Alternatively, the on-time $t_{on}$ can be such that a change in the resonant circuit is compensated.

Further structural variants of the system are now described which can use the same control methods as described above.

Figure 2B:
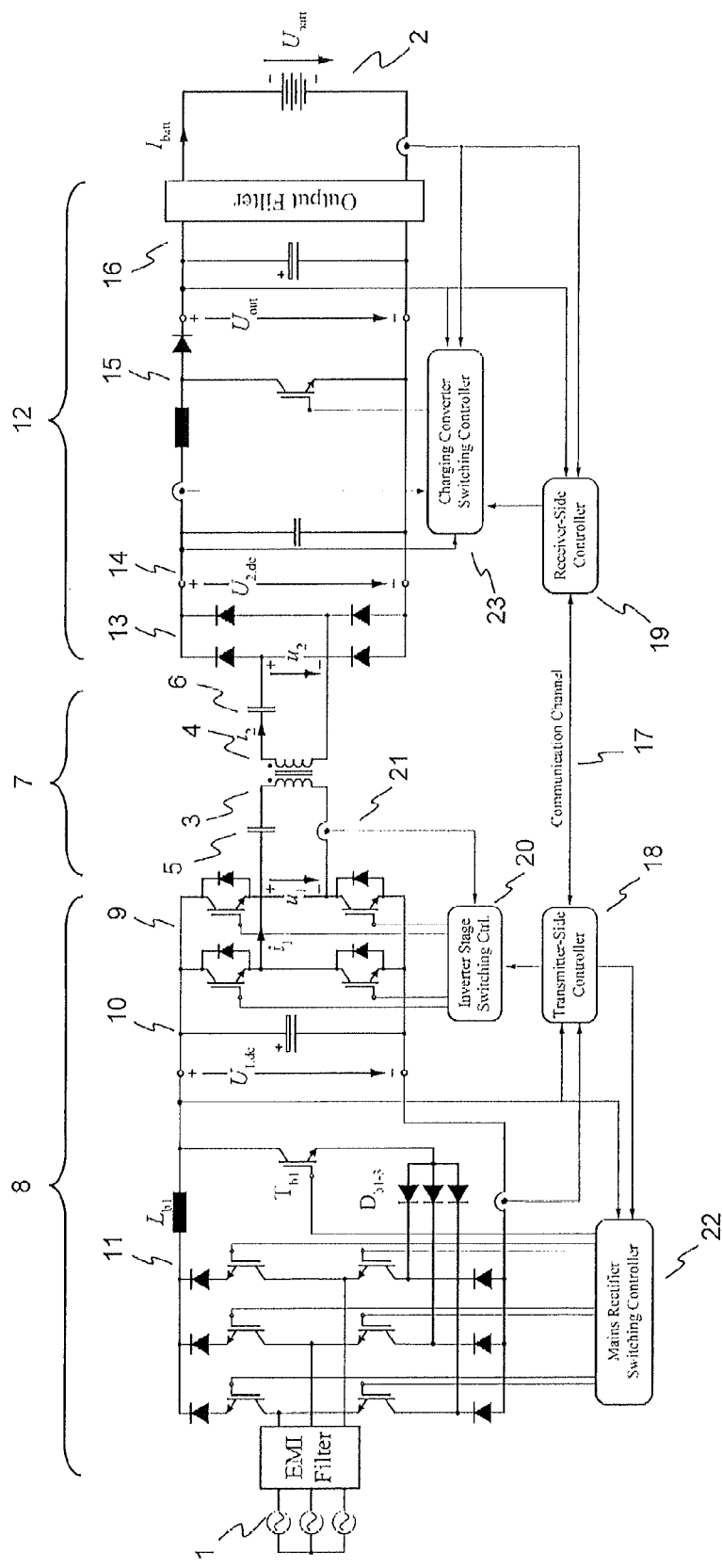
FIG. 2(b) illustrates a charging system in which a mains rectifier stage is realized as a buck+boost-type rectifier with six active power semiconductor switches according to an exemplary embodiment of the disclosure.
Figure 3:
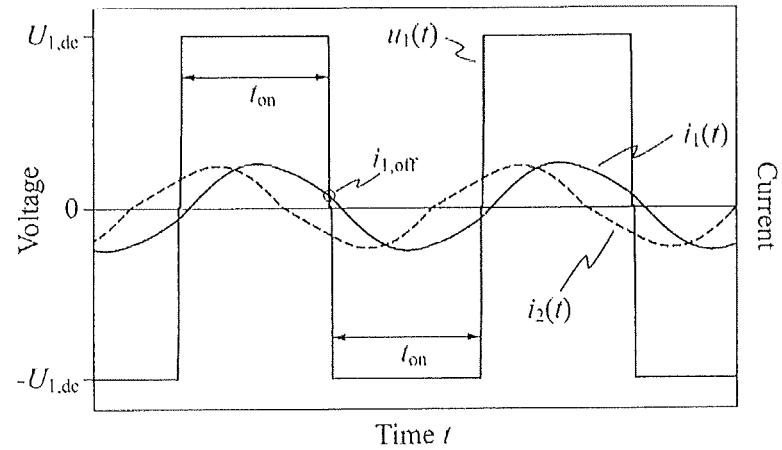
FIG. 3 illustrates waveforms of the output voltage of the transmitter-side power converter, the current in the transmitter coil, and the current in the receiver coil for the charging systems shown in FIG. 2(a) and FIG. 2(b) according to an exemplary embodiment of the disclosure.

Another exemplary embodiment of the present disclosure is shown in FIG. 2(b), where the mains rectifier stage 11 of the transmitter-side power converter is realized as a six-switch buck+boost-type rectifier with two active power semiconductors and two diodes on each bridge leg, while the remaining parts of the electrical circuit and the functionality is equal to the embodiment shown in FIG. 2(a). An advantage of this alternative embodiment is that standard power modules can be used for the active power semiconductors.

In yet another exemplary embodiment of the present disclosure, the mains rectifier stage 11 of the embodiment shown in FIG. 2(a) is realized as a boost-type rectifier with a cascaded dc-to-dc converter with buck capability, which is termed a boost+buck-type rectifier stage in known implementations. The remainder of the electrical circuit and the functionality is the same as that of the embodiment shown in FIG. 2(a).

In yet another exemplary embodiment of the present disclosure, the mains rectifier stage 11 of the embodiment shown in FIG. 2(a) is realized by a buck-type rectifier. The buck-type rectifier can include three bridge legs equal to either those of the buck+boost-type rectifier of the embodiment in FIG. 2(a) or those of the buck+boost-type rectifier of the embodiment in FIG. 2(b). However, it may not include the boost inductor $L_{b1}$, the boost switch $T_{b1}$, and the diodes $D_{b1-3}$, which are should be used exclusively for the boost mode. The remainder of the electrical circuit is the same as that of the embodiment in FIG. 2(a). An advantage of this exemplary embodiment is that it has a reduced complexity, however, the control of the transmitter-side bus voltage $U_{1,dc}$ is limited as only a voltage reduction is possible, which reduces the robustness of the system.

In another exemplary embodiment of the present disclosure, the transmitter-side inverter stage 9 and the mains rectifier stage 11 of FIG. 2(a) or FIG. 2(b) are integrated while the remainder of the electrical circuit and the functionality remains the same as that of the embodiment shown in FIG. 2(a). The transmitter-side power converter 8 could then work as an indirect ac-to-ac converter or a direct ac-to-ac converter without an energy storing element in the transmitter-side dc-bus, using space-vector or phase-oriented control techniques. This is often termed a matrix converter.

In yet another exemplary embodiment, the receiver-side rectifier stage 13 and receiver-side charging converter 15 are integrated, optionally in addition to an integration of the transmitter-side power converter 8, while the remainder of the electrical circuit and the functionality remains the same as that of the embodiment shown in FIG. 2(a). Active power semiconductors can be used instead of diodes in the receiver-side rectifier stage 13, thus forming a structure similar to a bridge-less rectifier with power factor correction as provided in known implementations. A measurement of the receiver coil current $i_2(t)$ can be included in the receiver-side power converter 12 to synchronize the control of the active power semiconductors to the receiver coil current $i_2(t)$.

According to exemplary embodiments of the present disclosure the various types of controllers described in the context of the present disclosure can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure, such as, those features specified for realizing a method for supplying electrical power from a transmitter-side subsystem connectable to a mains to a receiver-side subsystem connectable to a load, and thereby the processor(s) functions as a special and unique processor. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:
1. An inductive power transfer system for supplying electrical power from a transmitter-side subsystem connectable to a mains to a receiver-side subsystem connectable to a load, the system comprising:
 a transmitter coil and a receiver coil;
 a transmitter-side power converter including a mains rectifier stage to power a transmitter-side dc-bus and arranged to control a transmitter-side dc-bus voltage $U_{1,dc}$ according to a corresponding reference value $U_{1,dc}*$;
 a transmitter-side inverter stage with a controllable turn-off time of switches of the transmitter-side inverter stage to supply the transmitter coil with an alternating current;
 a receiver-side power converter having a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}*$;
 one or more power controllers arranged to determine a value that is indicative of a power transfer efficiency of the power transfer and to calculate, from this value indicative of the power transfer efficiency, the reference values $U_{1,dc}*$, $U_{2,dc}*$ for the transmitter-side dc-bus voltage $U_{1,dc}$ and the receiver-side dc-bus voltage $U_{2,dc}$;
 an inverter stage switching controller arranged to control the turn-off time of the switches of the transmitter-side inverter stage to at least minimize switching losses in the transmitter-side inverter stage; and a communication channel for transmitting the reference value $U_{1,dc}^*$ for the transmitter-side dc-bus voltage $U_{1,dc}$ from the receiver-side subsystem to the transmitter-side subsystem.

2. The inductive power transfer system of claim 1, wherein the value that is indicative of the power transfer efficiency is a magnetic coupling k between the transmitter coil and receiver coil.

3. The inductive power transfer system of claim 1, wherein the value indicative of the power transfer efficiency is computed from a measurement of an input power $P_{in}$ input into the transmitter-side inverter stage or the transmitter coil and a measurement of a received power $P_{out}$ that is output by the receiver coil or the receiver-side rectifier stage.

4. The inductive power transfer system of claim 1, wherein at least one of the reference values $U_{1,dc}^*$, $U_{2,dc}^*$ for the transmitter-side dc-bus voltage $U_{1,dc}$ and the receiver-side dc-bus voltage $U_{2,dc}$ is determined from a look-up table wherein reference values obtained from an off-line calculation are stored as a function of transmitter and receiver coil currents and a switching frequency $f_{sw}$ of the transmitter-side inverter stage.

5. The inductive power transfer system of claim 1, wherein the one or more power controllers are configured to compute the reference value $U_{2,dc}^*$ for the receiver-side dc-bus voltage $U_{2,dc}$ from a measured difference between a load current $I_{batt}$ and a reference value $I_{batt}^*$ for the load current; and to compute the reference value $U_{1,dc}^*$ for the transmitter-side dc-bus voltage $U_{1,dc}$ from the reference value $I_{batt}^*$ for the load current and a measured value of the load voltage $U_{batt}$.

6. The inductive power transfer system of claim 1, wherein the value that is indicative of the power transfer efficiency is a magnetic coupling k between the transmitter coil and receiver coil.

7. The inductive power transfer system of claim 1, wherein the value indicative of the power transfer efficiency is computed from a measurement of an input power $P_{in}$ input into the transmitter-side inverter stage or the transmitter coil and a measurement of a received power $P_{out}$ that is output by the receiver coil or the receiver-side rectifier stage.

8. The inductive power transfer system of claim 1, wherein at least one of the reference values $U_{1,dc}^*$, $U_{2,dc}^*$ for the transmitter-side dc-bus voltage $U_{1,dc}$ and the receiver-side dc-bus voltage $U_{2,dc}$ is determined from a look-up table wherein reference values obtained from an off-line calculation are stored as a function of transmitter and receiver coil currents and a switching frequency $f_{sw}$ of the transmitter-side inverter stage.

9. The inductive power transfer system of claim 1, wherein the one or more power controllers are configured to compute the reference value $U_{2,dc}^*$ for the receiver-side dc-bus voltage $U_{2,dc}$ from a measured difference between a load current $I_{batt}$ and a reference value $I_{batt}^*$ for the load current; and to compute the reference value $U_{1,dc}^*$ for the transmitter-side dc-bus voltage $U_{1,dc}$ from the reference value $I_{batt}^*$ for the load current and a measured value of the load voltage $U_{batt}$.

10. The inductive power transfer system of claim 1, wherein the inverter stage switching controller is arranged to control the transmitter-side inverter stage in an inductive region close to the resonant frequency $f_0$ of the transmitter for a switch-off current $i_{1,off}$ corresponding to a value of the transmitter coil current $i_1(t)$ at the time of commutation, that is at a value that minimizes a switching loss of the transmitter-side inverter stage.

11. The inductive power transfer system of claim 1, wherein the inverter stage switching controller is arranged to control the turn-off time of the switches of the transmitter-side inverter stage for a switch-off current $i_{1,off}$ to follow a switch-off current reference value.

12. The inductive power transfer system of claim 1, wherein the inverter stage switching controller is arranged to estimate a power loss in the semiconductor switches of the transmitter-side inverter stage and to perform an iterative search procedure, varying the turn-off time of the switches of the transmitter-side inverter stage to minimize the power loss.

13. The inductive power transfer system of claim 1, wherein the inverter stage switching controller is arranged to control the turn-off time of the switches of the transmitter-side inverter stage for the transmitter coil current $i_1(t)$ to have a constant phase shift relative to the output voltage $u_1(t)$ of the transmitter-side inverter stage.

14. A transmitter side subsystem of an inductive power transfer system, connectable to a mains and being able to supply electrical power to a receiver-side subsystem, the transmitter side subsystem comprising:
a transmitter coil;
a transmitter-side power converter including a mains rectifier stage to power a transmitter-side dc-bus and arranged to control a transmitter-side dc-bus voltage $U_{1,dc}$ according to a corresponding reference value $U_{1,dc}^*$, and
a transmitter-side inverter stage with a controllable turn-off time of switches of the transmitter-side inverter stage to supply the transmitter coil with an alternating current;
transmitter-side communication means for receiving the reference value $U_{1,dc}^*$ for the transmitter-side dc-bus voltage $U_{1,dc}$ from the receiver-side subsystem; and
an inverter stage switching controller arranged to control the turn-off time of the switches of the transmitter-side inverter stage to at least minimize switching losses in the transmitter-side inverter stage transmitter-side inverter stag.

15. A receiver side subsystem of an inductive power transfer system, the receiver-side subsystem being connectable to a load and being able to receive electrical power from a transmitter-side subsystem, the receiver-side subsystem comprising:
a receiver coil;
a receiver-side power converter including a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$;
a receiver-side controller arranged to determine a value that is indicative of a power transfer efficiency of the power transfer and to calculate, from this value indicative of the power transfer efficiency, reference values $U_{1,dc}^*$, $U_{2,dc}^*$ for a transmitter-side dc-bus voltage $U_{1,dc}$ and the receiver-side dc-bus voltage $U_{2,dc}$, and
receiver-side communication means for transmitting the reference value $U_{1,dc}^*$ for the transmitter-side dc-bus voltage $U_{1,dc}$ from the receiver-side subsystem to the transmitter-side subsystem.

16. A method for controlling an inductive power transfer system for supplying electrical power from a transmitter-side subsystem connectable to a mains to a receiver-side subsystem that is connectable to a load, the inductive power transfer system that includes:

a transmitter coil and a receiver coil;

a transmitter-side power converter having a mains rectifier stage to power a transmitter-side dc-bus;

a transmitter-side inverter stage with a controllable turn-off time of switches of the transmitter-side inverter stage to supply the transmitter coil with an alternating current; and a receiver-side power converter including a receiver-side rectifier stage to rectify a voltage induced in the receiver coil and to power a receiver-side dc-bus and a receiver-side charging converter arranged to control a receiver-side dc-bus voltage $U_{2,dc}$ according to a corresponding reference value $U_{2,dc}^*$;

the method comprising the steps of:

determining a value that is indicative of a power transfer efficiency of the power transfer and calculating, from this value indicative of the power transfer efficiency, reference values $U_{1,dc}^*$, $U_{2,dc}^*$ for a transmitter-side dc-bus voltage $U_{1,dc}$ and a receiver-side dc-bus voltage $U_{2,dc}$;

transmitting the reference value $U_{1,dc}^*$ for the transmitter-side dc-bus voltage $U_{1,dc}$ from the receiver-side subsystem to the transmitter-side subsystem;

controlling the mains rectifier stage for the transmitter-side dc-bus voltage $U_{1,dc}$ of the transmitter-side dc-bus to follow the corresponding reference value $U_{1,dc}^*$;

controlling the receiver-side charging converter for the receiver-side dc-bus voltage $U_{2,dc}$ of the receiver-side dc-bus to follow the corresponding reference value $U_{2,dc}^*$; and controlling the turn-off time of the switches of the transmitter-side inverter stage to at least minimize switching losses in the transmitter-side inverter stage transmitter-side inverter stage.

* * * * *